(12) United States Patent
Masiero et al.

(10) Patent No.: US 9,277,386 B1
(45) Date of Patent: Mar. 1, 2016

(54) OBJECT LOCATION TRACKING SYSTEM AND METHOD

(71) Applicants: Alberto Masiero, Vigodarzere (IT); Carlo Sanguin, Vigodarzere (IT)

(72) Inventors: Alberto Masiero, Vigodarzere (IT); Carlo Sanguin, Vigodarzere (IT)

( * ) Notice: Subject to any disclaimer, the term of this patent is extended or adjusted under 35 U.S.C. 154(b) by 0 days.

(21) Appl. No.: 14/451,970

(22) Filed: Aug. 5, 2014

(51) Int. Cl.
| | |
|---|---|
| H04W 4/22 | (2009.01) |
| H04W 64/00 | (2009.01) |
| H04W 4/00 | (2009.01) |
| H04W 4/02 | (2009.01) |
| H04M 11/04 | (2006.01) |
| H02J 7/02 | (2006.01) |

(52) U.S. Cl.
CPC .............. *H04W 4/22* (2013.01); *H02J 7/025* (2013.01); *H04M 11/04* (2013.01); *H04W 4/005* (2013.01); *H04W 4/02* (2013.01); *H04W 64/00* (2013.01)

(58) Field of Classification Search
CPC ................ G06Q 30/0205; G06Q 30/0261; H04W 4/02; H04W 64/00; H04W 4/025; H04W 4/22; H04L 67/18
See application file for complete search history.

(56) References Cited

U.S. PATENT DOCUMENTS

| | | | |
|---|---|---|---|
| 6,344,794 B1 * | 2/2002 | Ulrich | ................ G06K 17/0022 340/539.13 |
| 6,996,402 B2 | 2/2006 | Logan | |
| 7,075,433 B2 | 7/2006 | Singer | |
| 8,140,012 B1 | 3/2012 | Causey et al. | |
| 8,451,123 B2 | 5/2013 | Rofougaran | |
| 8,570,168 B2 | 10/2013 | Logan | |
| 2002/0121985 A1 | 9/2002 | Struble | |
| 2002/0126010 A1 | 9/2002 | Trimble et al. | |
| 2003/0063003 A1 | 4/2003 | Bero et al. | |
| 2004/0032325 A1 | 2/2004 | Singer | |
| 2005/0134459 A1 | 6/2005 | Glick et al. | |
| 2006/0022038 A1 * | 2/2006 | Hewlin | ............... G06K 7/10039 235/385 |
| 2006/0023626 A1 | 2/2006 | Krausz | |
| 2008/0030345 A1 * | 2/2008 | Austin | ................... A61B 19/44 340/572.8 |
| 2008/0088441 A1 | 4/2008 | Breed | |
| 2008/0174425 A1 | 7/2008 | Torning | |
| 2009/0015400 A1 | 1/2009 | Breed | |
| 2009/0135012 A1 | 5/2009 | Kim et al. | |
| 2009/0212941 A1 | 8/2009 | Vock | |
| 2010/0039266 A1 | 2/2010 | Faris et al. | |
| 2010/0144277 A1 | 6/2010 | Hsieh | |
| 2010/0178913 A1 | 7/2010 | Herbert et al. | |
| 2010/0259385 A1 | 10/2010 | Alston et al. | |
| 2010/0283600 A1 | 11/2010 | Herbert et al. | |
| 2011/0305369 A1 | 12/2011 | Bentley | |
| 2012/0013468 A1 | 1/2012 | Olah | |
| 2012/0322380 A1 | 12/2012 | Nannarone | |
| 2013/0043992 A1 | 2/2013 | Mayer-sommer et al. | |

* cited by examiner

*Primary Examiner* — Curtis Odom
(74) *Attorney, Agent, or Firm* — Quickpatents, LLC; Kevin Prince

(57) ABSTRACT

A system for tracking the location of an object in an area having a plurality of electronic devices, connected via a network through a variety of communication protocols, comprises a location server in communication with the network and each of the plurality of electronic devices. Each of the electronic devices is associated with a last-known device location within the area that is stored in the location server. An electronic tag that is fixed with the object has a control circuit that enables wireless communication with the network both through any of the electronic devices and through any of the variety of communication protocols. The control circuit maintains at least periodic contact and GPS location reporting with the location server through the network, preferably through one of the electronic devices designated as the owner device, or any of the other electronic devices.

24 Claims, 4 Drawing Sheets

# OBJECT LOCATION TRACKING SYSTEM AND METHOD

STATEMENT REGARDING FEDERALLY SPONSORED RESEARCH AND DEVELOPMENT

Not Applicable.

FIELD OF THE INVENTION

This invention relates to tracking valuable objects, and more particularly to a system for tracking the location of the objects through the use of electronic devices on a network.

DISCUSSION OF RELATED ART

Today cellular phone use, and in particular smart phone use, is quite common. Most such phones can use a variety of wireless protocols for two-way wireless communication, including Bluetooth, WiFi, CDMA, and the like. Most such phones are also capable of wirelessly accessing the Internet. Further, cellular phone towers now cover a wide range of the inhabited land on earth and provide two-way communication capability on a variety of cellular phone and SMS text messaging protocols.

Personal items such as keys, cellular phones, sunglasses, briefcases, purses, laptop bags, and like items are frequently misplaced or stolen. Children as well are often lost or even kidnapped. Such lost or stolen items are often within range of either other cellular phones or cell phone towers, and as such the possibility of recovery of such items utilizing the cellular communications network would be possible if such items included a suitable two-way communications device or "tag" that could access such a network or other networks with internet access.

U.S. Pat. No. 7,075,433 to Singer on Jul. 11, 2006 teaches a Bluetooth theft control device wherein an object transmits a "normal" signal to a guardian device and then waits for a response. If no response arrives, the object transmits an "alarm" signal to a monitoring device. However, if the guardian device and monitoring device is not within range of the object's transmitter, neither such device will be alerted to the alarm signal and the object will remain lost. Without historical position information it is difficult to know where to start a search for the object when it's lost.

U.S. Pat. No. 6,563,427 to Bero et al. on May 13, 2003 teaches a proximity monitoring communication system. A wide-area network has at least two registered master devices, one of which is in wireless communication with a slave device worn by a child or affixed to a valuable object. If the slave device loses communication with the master device, "control" is transferred to another master device on the wide area network. However, if the slave device loses communication with all of the master devices a general alarm is sounded that the slave device is lost. Such a device does not provide for recording the last known location of the slave device, nor does it allow the slave device to communicate directly on the wide area network, such as by sending an SMS text message on a wide-area cellular network. Such a device further does not provide for the slave unit, through a GPS location circuit, transmitting its location to the network. No master database of history locations or last-known locations is provided, making it more difficult to know where to start a search for the lost slave unit.

WIPO application number WO2014/030009 to Sarkar on Feb. 27, 2014, teaches a monitoring system that includes a remote server adapted to receive location information of mobile devices that are in communication with one or more tags to be monitored. Such a system requires the activation of a "lost" signal by one of the mobile devices before the other nearby mobile devices begin searching for the lost tag. By that time, however, it may be too late as the tag (and the object to which the tag is affixed) may have been removed from an area with suitable mobile monitoring devices. Further, the tag itself in such a system does not have any geo-locating capability itself, and thus if it loses contact with the mobile devices it has no way of reporting its location to the remote server or the mobile devices.

Further, if the mobile device that's in communication with the tag becomes disabled, such as by being dropped into a lake for example, such a system provides no means for locating the lost tag since the mobile device to which the tag is assigned cannot alert the remote server that the tag is lost. Still further, if the remote server becomes unreachable or inoperative, none of the mobile devices are able to communicate with each other the location of the tags that are within their ranges to any of the other mobile devices. Therefore, there is a need for a device that maintains a central database of last-known locations of an object to be tracked, and a history of locations of such an object even when the object is not considered lost. Further, such a needed system would provide for maintaining contact with and determining the location of the object, all while maximizing battery life within an electronic tag of the object. The present invention accomplishes these objectives.

SUMMARY OF THE INVENTION

The present device is a system for tracking the location of an object in an area having a plurality of electronic devices connected via a network through a variety of communication protocols. For example, the object may be a set of keys or other item of value to its owner. Any of the electronic devices may be, for example, cellular phones utilizing a Bluetooth protocol, wireless network routers utilizing a WiFi protocol, a laptop computer using the WiFi protocol, a cellular tower utilizing a CDMA protocol, or the like. The network may be the internet, a cellular phone network, both, or the like.

The system comprises a location server has at least a non-transitory computer-readable storage medium and is in communication with the network and each of the plurality of electronic devices. Each of the electronic devices is associated with a last-known device location within the area that is stored in the storage medium. For example, a cellular tower has a known geographic location that can be stored in the storage medium, such as by using latitude and longitude coordinates, physical street addresses, or the like. Likewise, a cellular phone may be running an application that determines its approximate location through GPS, assisted GPS, cellular tower triangulation, or the like.

The system further comprises an electronic tag that is fixed with the object and has a computer-implemented control circuit that enables wireless communication with the network both through any of the electronic devices and through any of the variety of communication protocols. The control circuit includes a power source, a processor, and a second non-transitory computer-readable storage medium that contains a set of computer instructions adapted for causing the control circuit to maintain at least periodic contact with the location server through the network.

Preferably one of the electronic devices is designated as the owner device of the object with which the tag is affixed. The system further includes a set of computer instructions that are adapted for causing the owner device to maintain at least periodic contact with the location server through the network and to transmit to the location server the approximate location of the tag and to the extent possible the location of the owner device.

In one embodiment, any nearby electronic device that is not designated as the owner device is designated as a possible rescue device. The system further includes a set of the computer instructions that cause each possible rescue device to maintain at least periodic contact with the location server through the network and to transmit to the location server the approximate location of the tag and to the extent possible the location of the possible rescue device.

In one embodiment, the control circuit further includes an audio transducer with a volume control, such as a speaker or buzzer, that may be remotely activated when receiving an activation command from the location server, the owner device, or any of the other electronic devices. As such, when the object is missing but within a short range of the owner device, the audio transducer may be activated so that the object may be located by sound. In one embodiment, the audio transducer is an ultrasonic transducer, and the owner device is adapted to determine a location direction of the tag based on the orientation of the owner device that results in the largest amplitude of an ultrasonic signal generated by the tag. Such an ultrasonic sound may be randomly generated or the result of a preset sequence so as to avoid interference between the tag and those nearby.

In a preferred embodiment, the control circuit further includes a GPS location circuit for determining the location of the electronic tag. The control circuit is further adapted to communicate the location of the electronic tag to the location server through the network or any of the electronic device s connected to the network, such as the owner device, possible rescue devices, cellular towers, or the like.

Several modes of operation describe the system in-use. In a standard operating mode, referred to herein as short range mode, the location server receives periodic contact with the tag through one or more of the electronic devices. Preferably the owner device is in frequent contact with the tag due to close proximity therebetween, the tag using the lowest power protocol or the protocol most suitable for the distance between the owner device and the tag.

As the tag moves away from the owner device, but still is within range of one or more of the protocols used by the owner device, the strength of the signal between the owner device and the tag is reduced. At one or more preset thresholds the owner device may alert the user of the device with a sound, text message, vibration, or other appropriate alert. With any such proximity alert the location server is preferably also notified as to the range of the tag away from the owner device.

If the tag subsequently moves out of communication range with the owner device completely, the location server is notified by the owner device and the system then is placed into a community search mode, wherein other nearby electronic devices, if making contact with the tag, inform the location server the approximate location of the tag. The location server then sends a message to the owner device as to the approximate location of the tag. If the owner device subsequently comes into communication range of the tag, the system then returns to the short range mode for that tag. Preferably, even in short range mode, if one of the possible rescue devices makes contact with the tag, the possible rescue devices informs the location server of the approximate location of the tag, just in case the most recent approximate location becomes is needed in the future.

In certain situations the electronic devices that are within range of the tag may only utilize long-range communication protocols, such as in the case of cellular phone towers that utilize GSM, CDMA, AMPS, or similar cellular phone protocols. In such a scenario, the approximate location of the tag can be determined by the use of triangulation of relative signal strengths or comparison of time signal broadcasts to three or more of the cell phone tower electronic devices.

If no other electronic devices on the network is able to make contact with the tag within a predetermined period of time, then the tag may attempt to send to the location server its location, obtained through the GPS location circuit, directly via the SMS text messaging network protocol, in which case the tag only has to be within communication range of one of the cell phone tower electronic devices. As such, if the tag knows its own location, any means of transmitting that information to the location server may be utilized. Once the location server obtains an updated location of the tag, the location server may then communicate with the owner device through the network such updated location information.

The present invention maintains a central database of last-known locations of an object to be tracked, and a history of locations of such an object. Further, the present system provides for maintaining contact with and determining the location of the object, typically at least every few seconds. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provided specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
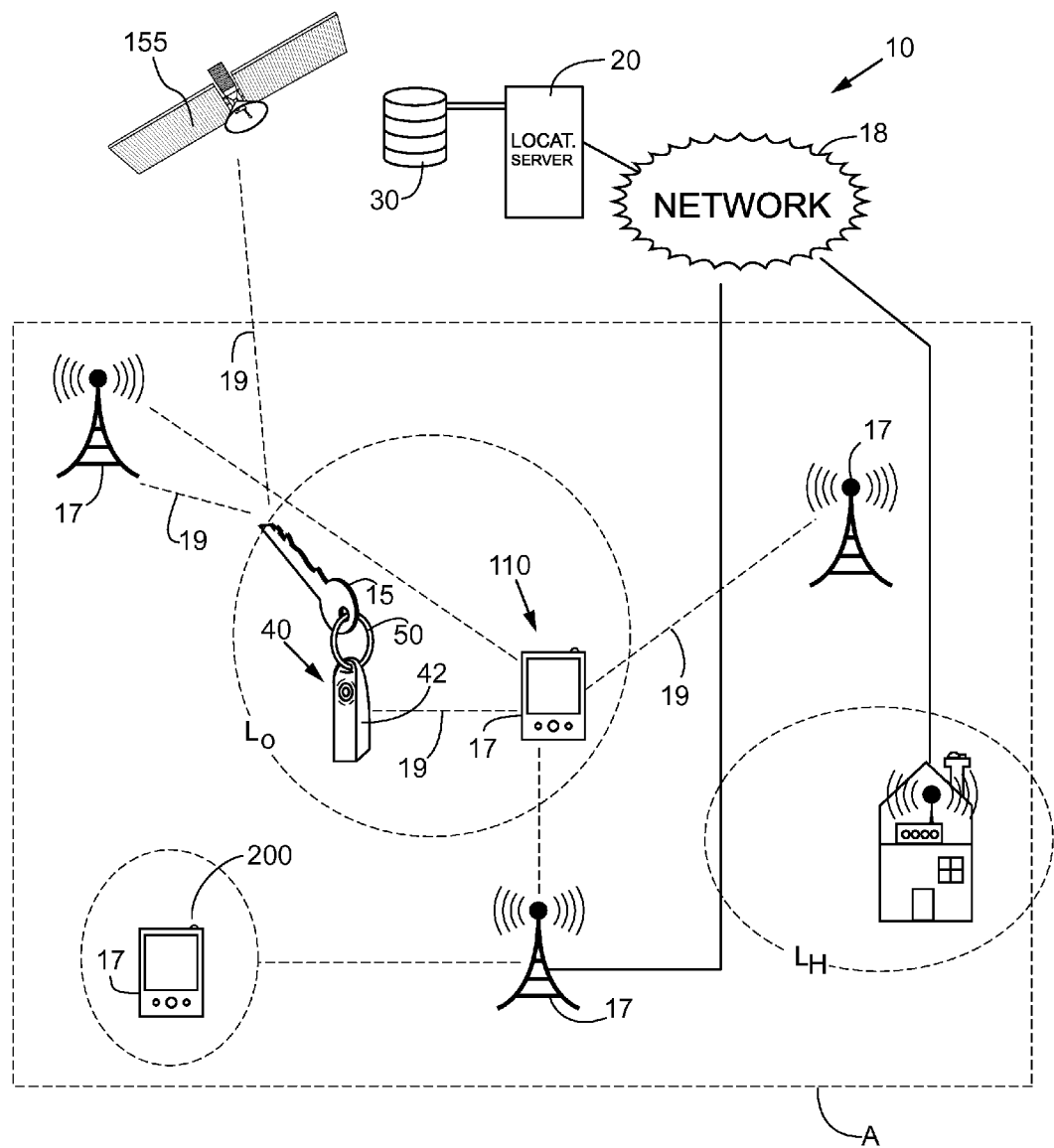
FIG. 1 is a diagram of a system for tracking the location of an object in an area having a plurality of electronic devices connected via a network through a variety of communication protocols.
Figure 2:
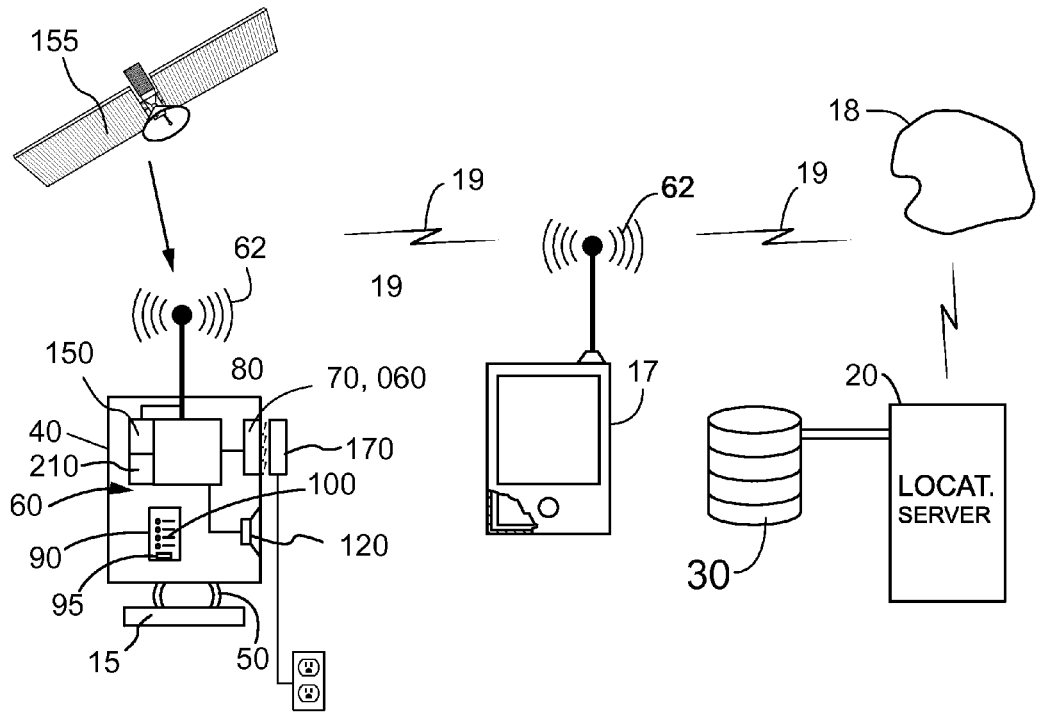
FIG. 2 is a diagram of internal components of the system of FIG. 1.

FIGS. 1 and 2 illustrate a system 10 for tracking the location $L_O$ of an object 15 in an area A having a plurality of electronic devices 17 connected via a network 18 through a variety of communication protocols 19. For example, the object 15 may be a set of keys or other item of value to its owner. Any of the electronic devices 17 may be, for example, cellular phones utilizing a Bluetooth protocol 19, wireless network routers utilizing a WiFi protocol 19, a laptop computer using the WiFi protocol 19, a cellular tower utilizing a CDMA protocol, or the like. The network 18 may be the internet, a cellular phone network, both, or the like.

A location server 20 has at least a non-transitory computer-readable storage medium 30 and is in communication with the network 18 and each of the plurality of electronic devices 17. Each of the electronic devices 17 is associated with a last-known device location within the area A that is stored in the storage medium 30. For example, a cellular tower 17 has a known geographic location that can be stored in the storage medium 30, such as by using latitude and longitude coordinates, physical street addresses, or the like. Likewise, a cellular phone 17 may be running an application that determines its approximate location $L_A$ through either GPS, assisted GPS, cellular tower triangulation, or the like. Even a device 17 that does not have GPS or other means of determining location may be prompted for a location when added to the network, or in a worse-case scenario an IP address of the device 17 may be used to generally locate the device or the network to which the device 17 is connected.

An electronic tag 40 is fixed with the object 15 and has at least a computer-implemented control circuit 60 that enables wireless communication with the network 18 both through any of the electronic devices 17 and through any of the variety of communication protocols 19. The control circuit 60 includes a power source 70, a processor 80, and a second non-transitory computer-readable storage medium 90 that contains a unique tag identifier 95 and a set of computer instructions 100 adapted for causing the control circuit 60 to maintain at least periodic contact with the location server 20 through the network 18, such as every 30 seconds to every 10 minutes, for example. Each tag 40 includes a preferably globally-unique identifier that the control circuit 60 is able to transmit through the devices 17 and network 18 to the location server 20.

Preferably an enclosure 42 encloses the control circuit 60. An attachment mechanism 50, such as a key ring, wrist band (not shown), adhesive tape, or the like may be used to attach the enclosure 42 of the tag 40 to the object 15. In some embodiments, the tag 40 is incorporated into the object 15, meaning that in the case where the object 15 includes an enclosure itself, the tag 40 may be contained within the enclosure of the object 15. For example, if the object 15 is itself a cellular phone, the tag 40 may be incorporated into the circuitry of the cellular phone and contained within the outer housing or enclosure of the cellular phone.

Preferably one of the electronic devices 17 is designated as the owner device 110 (FIG. 3) of the object 15 with which the tag 40 is affixed. The system 10 further includes a set of computer instructions 100 that are adapted for causing the owner device 110 to maintain at least periodic contact with the location server 20 through the network 18 and to transmit to the location server 20 the approximate location $L_A$ of the tag 40 and to the extent possible the location of the owner device 110. Preferably the tag 40 prioritizes the communication protocol 19 having either the lowest power requirement that maintains contact with the owner device 110, or the lowest range that is still within range to maintain contact with the owner device 110.

Figure 4:
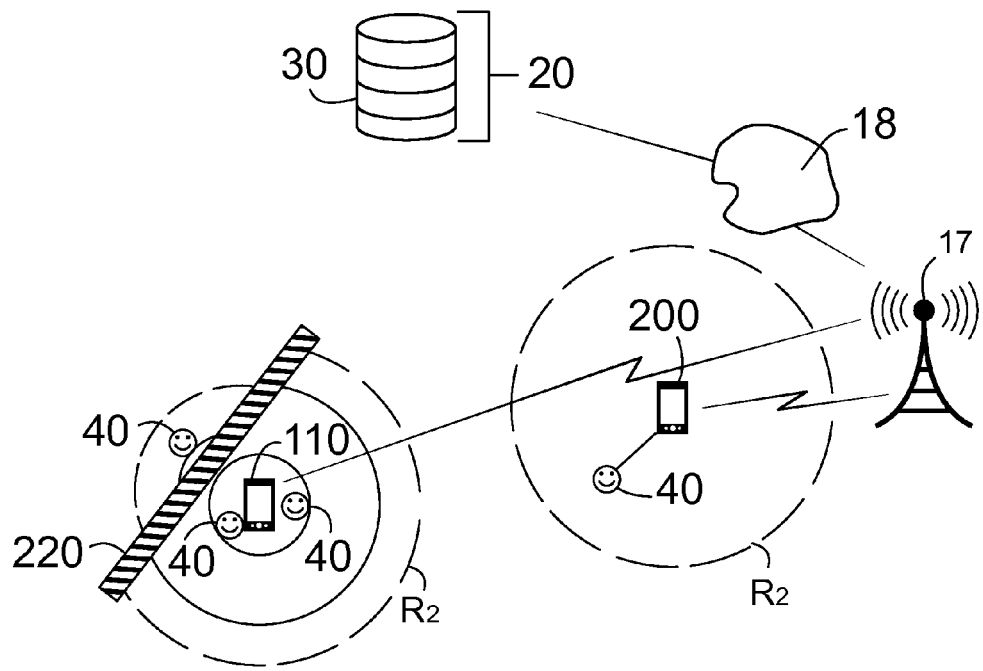
FIG. 4 is a diagram of the area wherein one of the tags exceeds the range of the owner electronic device but is within the range of a rescue electronic device.

In one embodiment, any nearby electronic device 17 that is not designated as the owner device 110 is designated as a possible rescue device 200 (FIG. 4). The system 10 further includes a set of the computer instructions 100 that cause each possible rescue device 200 to maintain at least periodic contact with the location server 20 through the network 18 and to transmit to the location server 20 the approximate location $L_A$ of the tag and to the extent possible the location of the possible rescue device 200. In such an embodiment, the frequency of the periodic contact between each possible rescue device 200 and the tag 40 is preferably less than the frequency of periodic contact between the owner device 110 and the tag 40 to preserver battery life of the tag 40. Alternately, each possible rescue device 200 may be in communication with the owner device 110 to determine which tags 40, owned by the owner device 110, may at some point require a rescue. However, the possible rescue device 200 in this embodiment does not communicate directly with any of the tags 40 owned by the owner device 40 unless receiving a lost tag signal from the location server 20, the owner device 40, or from any of the tags 40 themselves.

Further, such a possible rescue device 200 preferably serves the system 10 in a ghost mode, wherein the user of the possible rescue device 200 is not informed of the communication between the possible rescue device 200 and the location server 20 on behalf of the tag 40 and the owner of the object to which the tag 40 is attached. As such, users of the electronic devices 17 may not be aware that in addition to maintaining contact with the tag 40 of the object 15, their electronic device 17 may also be keeping track of the approximate location of other tags 40 belonging to other users. That is to say, users of a rescue device 200 are kept unaware that their electronic device 17 is being used as a rescue device 200, so that such users may not become aware that a valuable object 15 may be lost nearby, for example.

In one embodiment, the control circuit 60 further includes an audio transducer 120, such as a speaker, buzzer, or ultrasonic transducer, that may be remotely activated when receiving an activation command 130 from the location server 20, the owner device 110, or any of the other electronic devices 17. In such an embodiment, the control circuit 60 is adapted to vary the volume of the audio transducer 120 based on a volume command 140 received from the location server 20 or any of the electronic devices 17. As such, when the object 15 is missing but within a short range of the owner device 110, the audio transducer 120 may be activated so that the object 15 may be located by sound. In one embodiment, the audio transducer 120 is an ultrasonic transducer 120, and the owner device 110 is adapted to determine a location direction of the object 15 based on the orientation of the owner device 110 that results in the largest amplitude of an ultrasonic signal generated by the tag 40. In the case where the owner device 110 is a computerized pair of glasses with a display (not shown), such as the Google Glass-branded line of products, the display can be used to show the direction in which the lost tag 40 lies based on sound amplitude, wireless signal strength, or a combination thereof.

Figure 5:
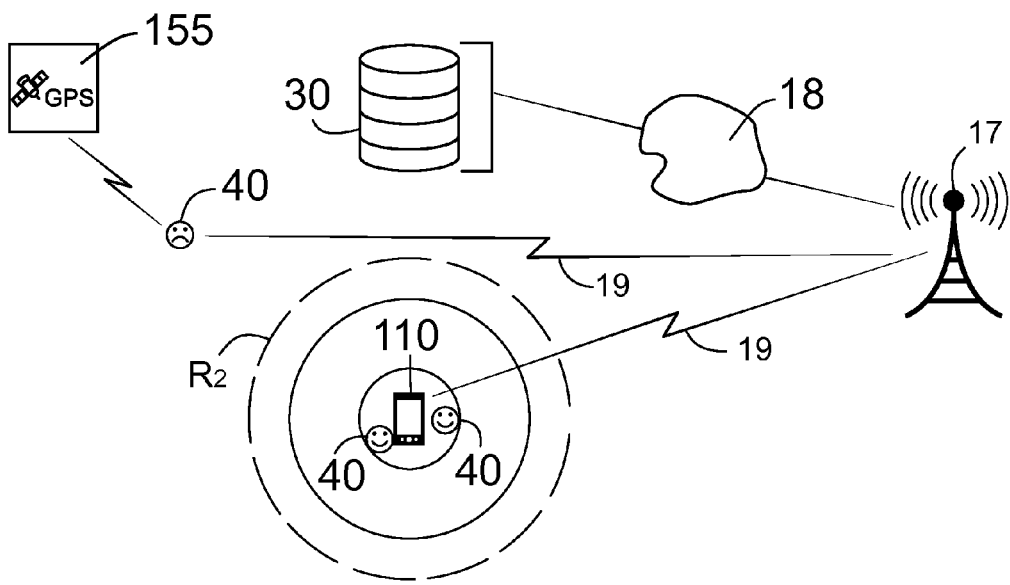
FIG. 5 is a diagram of the area wherein one of the tags exceeds the range of the owner electronic device but is within the range of a rescue electronic device and receives a location signal from a GPS satellite.

In a preferred embodiment, the control circuit 60 further includes a GPS location circuit 150 for determining the location of the electronic tag 40. The control circuit 60 is further adapted to communicate the location of the electronic tag 40 to the location server 20 through the network 18 or any of the electronic device s 17 connected to the network 18 (FIG. 5), such as the owner device 110, possible rescue devices 200, cellular towers 17, WiFi routers 17 (FIG. 1) that access the internet network 18, or the like.

In one embodiment of the invention, the power source 70 of the control circuit 60 includes a rechargeable battery 160 that is charged by an AC adapter (not shown), a solar-cell energy collector (not shown), a wireless charger 170 through induction (FIG. 2), a piezoelectric charger 171 through vibration or motion of the tag 40, a thermal charger 172 through heat applied to the tag 40, or other suitable means. As such, even if the tag 40 is integrally formed with the object 15, vibration or heat may be used to maintain an adequate charge of the battery 160. Optionally, if the rechargeable battery 160 is low on charge, the tag 40 may alert the owner device 110 that the battery 160 in the tag 40 needs to be recharged.

In one embodiment the tag 40 is attached to the object 15 with an attachment mechanism 50, such as a keychain. In other embodiments, the tag 40 is embedded or integrally formed with the object 40. For example, the tag 40 may be built into a cellular phone case (not shown), or incorporated into the cell phone circuitry during manufacturing. As such, a tag 40 may be applied to an object 15 in an after-market fashion, or be built into the object 15 during manufacture.

Figure 3:
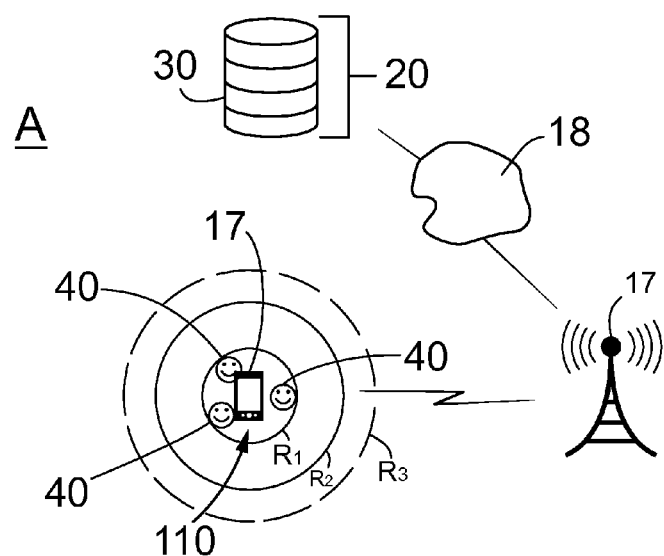
FIG. 3 is a diagram of the area in which a plurality of tags are associated with an owner electronic device.

Several modes of operation describe the system 10 in-use. In a standard operating mode, referred to herein as short range mode 180, the location server 20 receives periodic contact with the tag 40 through one or more of the electronic devices 17 (FIG. 3). Preferably the owner device 110 is in frequent contact with the tag 40 due to close proximity therebetween, the tag 40 using the lowest power protocol 19 or the protocol 19 most suitable for the distance between the owner device 110 and the tag 40. For example, the owner device 110 may be a so-called "smart phone" and the object 15 to track may be a set of keys with the tag 40 affixed thereto with an attachment mechanism 50, such as a keychain. In the short range mode 180, such an owner device 110 may be in contact with the tag 40 through a Bluetooth-type protocol 19, for example.

As the tag 40 moves away from the owner device 110, but still is within range of one or more of the protocols 19 used by the owner device 110, the strength of the signal between the owner device 110 and the tag 40 is reduced. At one or more preset thresholds the owner device may alert the user of the device 110 with a sound, text message, vibration, or other appropriate alert. With any such proximity alert the location server 20 is preferably also notified as to the range of the tag 40 away from the owner device 110.

Likewise, it may be that the tag 40 moves out of range of one protocol 19, such as a Bluetooth protocol, and yet remains within the range of another one of the protocols 19, such as a WiFi protocol. Accordingly, in such a scenario it is determined that the object has moved a certain distance away from the owner device 110 based on the range of the first and second protocols 19, and the owner device 110 may again alert the user of the device 110 with a sound, text message, vibration, or other appropriate alert. With any such proximity alert the location server 20 is preferably also notified as to the range of the tag 40 away from the owner device 110.

If the tag 40 subsequently moves out of communication range with the owner device 110 completely, the location server 20 is notified by the owner device 110 and the system 10 then is placed into a community search mode 190, wherein other nearby electronic devices 17, if making contact with the tag 40, inform the location server 20 the approximate location $L_A$ of the tag 40. The location server 20 then sends a message to the owner device 110 as to the approximate location of the tag 40. Such a message may be a text message, an automated phone call, an email, a social media chat message, or the like, as established by the owner of the object 15. If the owner device 110 subsequently comes into communication range of the tag 40, the system 10 then returns to the short range mode 180 for that tag 40. Preferably, even in short range mode 180, if one of the possible rescue devices 200 makes contact with the tag 40, the possible rescue devices 200 informs the location server 20 of the approximate location $L_A$ of the tag 40, just in case the most recent approximate location $L_A$ becomes is needed in the future.

In certain situations the electronic devices 17 that are within range of the tag 40 may only utilize long-range communication protocols 19, such as in the case of cellular phone towers that utilize GSM, CDMA, AMPS, or similar cellular phone protocols 19. In such a scenario, the approximate location $L_A$ of the tag 40 can be determined by the use of triangulation of relative signal strengths or comparison of time signal broadcasts to three or more of the cell phone tower electronic devices 17.

If no other electronic devices 17 on the network 18 is able to make contact with the tag 40 within a predetermined period of time, such as five to sixty minutes, the tag 40 may then attempt to send to the location server 20 its location $L_O$, obtained through the GPS location circuit 150, directly via the SMS text messaging network protocol 19, in which case the tag 40 only has to be within communication range of one of the cell phone tower electronic devices 17. As such, if the tag 40 knows its own location $L_O$ or its last known approximate location $L_A$, any means of transmitting that information to the location server 20 may be utilized. Once the location server 20 obtains an updated location $L_O$ or approximate location $L_A$ of the tag 40, the location server 20 may then communicate with the owner device 110 through the network 18 such updated location information.

In an embodiment wherein the tag 40 is embedded or otherwise permanently fixed with the object 15, the system 10 may also be used as an anti-theft system, wherein if a tag 40 is reported as stolen then any electronic device 17 on the network 18 that detects the tag 40 may immediately report the tag's approximate location $L_A$ to the owner of the object 15 or to police authorities. For example, the tag 40 may be embedded into the frame of a valuable piece of artwork. If the artwork is stolen, any electronic device 17 on the network 18, which may be global in scope, can be used to report the approximate location $L_A$ of the artwork upon detection.

Alternately, the system 10 may be used as an authenticity system when the tag 40 is integrally formed with a valuable object 15, such as a work of art. In such an embodiment, since the tag 40 uniquely identifies itself, a record of a unique identifier (not shown) of the tag may be included to later authenticate that the object 15 is authentic.

In one embodiment, wherein the tag 40 is within a known "safe" location $L_H$ (FIG. 1) such as a home location in proximity to a WiFi electronic device 17, the frequency of contacts between the tag 40 and the owner device 110 may be reduced several fold, such as from once per second down to once every three to five seconds, for example. Further, in one embodiment, once the tag 40 is within the known safe location $L_H$, periodic communication with the owner device 110 is halted, or reduced considerably and perhaps randomly, until the tag 40 is moved outside of the range of the safe location WiFi electronic device 17, for instance. As such, battery life of the tag 40 and the owner device 110 is conserved. In such a mode, the audio transducer 120 may still be activated if one's keys are lost in the safe location $L_H$, for example.

In such a scenario where the tag 40 is within the safe location $L_H$, the WiFi electronic device 17 may be said to share the ownership of the tag 40 with the owner device 110, which may be a smart phone for example. As such, multiple electronic devices 17 may be designated as sharing owners 110 of the tag 40, and such shared owners 110 may be designated with a priority ranking so that in the absence of the first priority owner device 110, the second priority owner device 110 "takes over" ownership of the tag 40. Such ownership ranking may be established on the location server 20 through a web-type interface, for example. As long as the tag 40 remains within communication range of any of the designated sharing owners 110 then the tag 40 is not considered lost.

In one embodiment, the tag 40 includes an accelerometer 210 (FIG. 2), preferably a 3-axis accelerometer 210, which can be utilized by the control circuit 60 to determine if the tag 40 is being moved and, if so, integrating over the acceleration data to estimate a movement distance. If the movement distance away from the owner device 110 is not proportionate to a reduction in signal strength between the owner device 110 and the tag 40, then the system 10 may assume that the tag 40 has simply been moved to the other side of an obstacle 220 (FIG. 4), such as a wall. For example, the tag 40 may be moved into a bedroom while the owner device remains in a living room, for example. As such, even if the signal strength of the communication between the owner device 110 and the tag 40 drops below a threshold that would normally trigger an alert, if the accelerometer data does not support the assumption that the tag 40 has been moved a sufficient distance to warrant an alert then the alert may be forestalled, at least until further movement of the tag 40 away from the owner device 110 or further signal strength loss between the tag 40 and the owner device 110.

Likewise, many smart phones include 3-axis accelerometer devices, and if movement of the owner device 110 away from the tag 40, which remains stationary, does not support the assumption that the owner device 110 has moved sufficiently away from the tag 40, even though the communication signal strength therebetween may have decreased by a sufficient amount to trigger an alert, such an alert may be forestalled. For example, a person's wallet with a tag 40 may be left in an automobile while the owner and his cellular phone owner device 110 may have walked into a nearby building. If the automobile structure is an obstacle 220 that significantly reduces the signal strength between the tag 40 and the owner device 110, without accelerometer data it may be assumed that the owner device 110 has moved much further away from the tag 40 than is actually the case. Accordingly, accelerometer data on either the owner device 110 or the tag 40 may be used to adjust the assumed separation distance therebetween.

Figure 6:
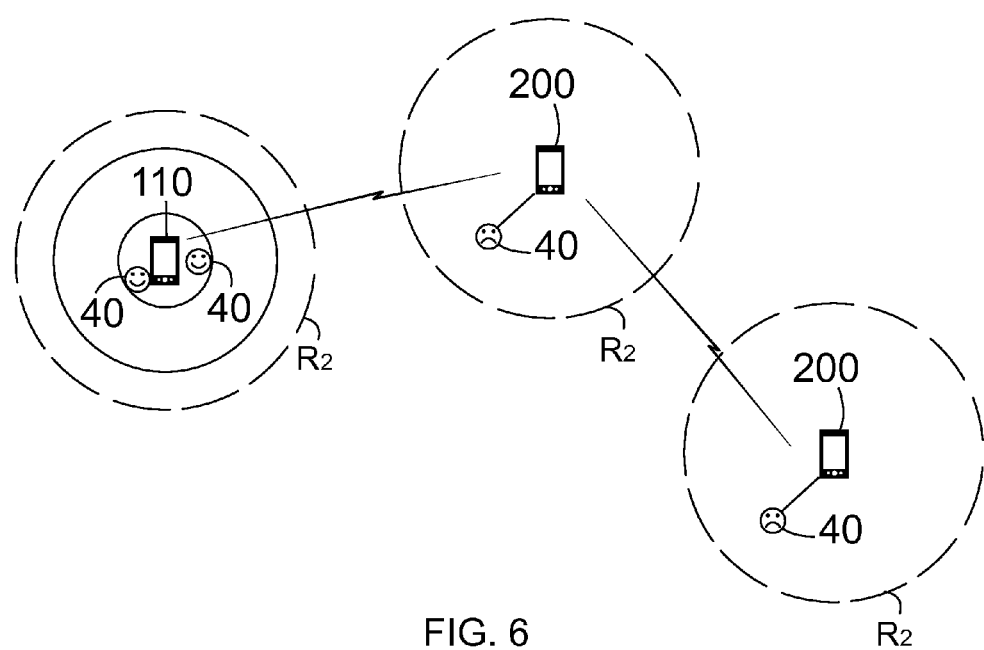
FIG. 6 is a diagram of the area wherein one of the tags exceeds the range of the owner electronic device but is within the range of a rescue electronic device that is within the range of another rescue electronic device that is within the range of the owner device.

In one embodiment, the set of computer instructions 100 is further adapted for causing each of the plurality of electronic devices 17 within the area to wirelessly communicate with each other the unique identifier 95 and location $L_O$ of each of the electronic tags 40 and positions thereof within their respective ranges, such as when the location server 20 is unavailable. In such an embodiment, each of the plurality of electronic devices 17 may be further caused to wirelessly communicate with each other the unique identifier 95 and location $L_O$ of each of the electronic tags 40 and locations $L_O$ thereof within their respective ranges, and to further communicate with each other the unique identifier 95 and locations $L_O$ of each of the electronic tags 40 within the range of other electronic devices 17 within their communication range. In this way neighboring electronic devices 17 not only can share the unique identifier 95 and locations $L_O$ of each of the electronic tags 40 within their range, but can do likewise for their neighbor's neighboring electronic devices 17 (FIG. 6).

In one embodiment, the set of computer instructions 100 is further adapted to cause the tag 40 to transmit a rescue-me signal if the tag 40 has failed to maintain communication with its owner device 110 after a predetermined time. In such an embodiment, a nearby rescue device 200 upon detection of the rescue-me signal transmits to the location server 20 and its neighboring electronic devices 17 the unique identifier 95 and location $L_O$ of the tag 40 sending the rescue-me signal.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for tracking the location of an object in an area having a plurality of electronic devices connected via a network through a variety of communication protocols, the system comprising:
   a location server having at least a non-transitory computer-readable storage medium and in communication with the network and each of the plurality of electronic devices, each of the electronic devices being associated with a last-known device location within the area that is stored in the storage medium of the location server;
   an electronic tag fixed with the object and having a computer-implemented control circuit to enable wireless communication with the network both through any of the electronic devices and through any of the variety of communication protocols, the control circuit further including a power source, a processor, a unique identifier, and a second non-transitory computer-readable storage medium containing a set of computer instructions adapted for causing the control circuit to maintain at least periodic contact with the location server through the network;
   whereby based on the most recent contact with the electronic tag based on its unique identifier, the last-known device location of each device through which the tag communicated with the location server, and the communication protocol used between the tag and its nearest electronic device, the approximate location of the object and tag is determined and stored in the storage medium of the server.

2. The system of claim 1 wherein one of the electronic devices is designated as the owner device of the object with which the tag is affixed, the system further including a set of computer instructions adapted for causing the owner device to maintain at least periodic contact with the location server through the network and to transmit to the location server the approximate location of the tag and to the extent possible the location of the owner device.

3. The system of claim 2 wherein the electronic tag prioritizes the communication protocol having the lowest power requirement that maintains contact with the owner device.

4. The system of claim 2 wherein the electronic tag prioritizes the communication protocol having the lowest range that is still within range to maintain contact with the owner device.

5. The system of claim 2 wherein any nearby electronic device that is not designated as the owner device is designated as a possible rescue device, the system further including a set of computer instructions adapted for causing each possible rescue device to maintain at least periodic contact with the location server through the network and to transmit to the location server the approximate location of the tag and to the extent possible the location of the possible rescue device.

6. The system of claim 2 wherein the frequency of periodic contact between each possible rescue device and the tag is less than the frequency of periodic contact between the owner device and the tag.

7. The system of claim 2 wherein any nearby electronic device that is not designated as the owner device is designated as a possible rescue device, the owner device communicating to each possible rescue device the unique identifiers of each of the tags designated as owned by the owner device, the system further including a set of computer instructions adapted for causing each possible rescue device to maintain at least periodic contact with the location server through the network and to transmit to the location server the approximate location of the possible rescue device.

8. The system of claim 1 wherein the control circuit further includes an audio transducer that may be remotely activated when receiving an activation command from the location server or any of the electronic devices.

9. The system of claim 8 wherein the control circuit can vary the volume of the audio transducer based on a volume command received from the location server or any of the electronic devices.

10. The system of claim 1 wherein the control circuit further includes a GPS location circuit for determining the location of the electronic tag, the control circuit further adapted to communicate the location of the electronic tag to the location server through the network or any of the electronic devices connected to the network.

11. The system of claim 1 wherein the set of computer instructions is further adapted for causing each of the plurality of electronic devices within the area to wirelessly communicate with each other the unique identifier and location of each of the electronic tags and positions thereof within their respective ranges.

12. The system of claim 1 wherein the power source of the control circuit includes a rechargeable battery, and wherein the control circuit further includes a wireless charger for wirelessly charging the rechargeable battery by induction.

13. The system of claim 12 wherein the power source of the control circuit includes a rechargeable battery, and wherein the tag is integrally formed with the object, and wherein the rechargeable battery is recharged with a piezoelectric or thermal charger through vibration and motion of the object or through heat applied to the object.

14. The system of claim 11 wherein the set of computer instructions is further adapted for causing each of the plurality of electronic devices within communication range to wirelessly communicate with each other the unique identifier and location of each of the electronic tags and positions thereof within their respective ranges, and to further communicate with each other the unique identifier and location of each of the electronic tags and positions thereof within the range of other electronic devices within their communication range.

15. The system of claim 5 wherein the set of computer instructions is further adapted to cause the tag to transmit a rescue-me signal if the tag has failed to maintain communication with its owner device after a predetermined time, and wherein each nearby rescue device upon detection of the rescue-me signal transmits to the location server the unique identifier and location of the tag sending the rescue-me signal.

16. The system of claim 7 wherein the set of computer instructions is further adapted to cause the tag to transmit a rescue-me signal if the tag has failed to maintain communication with its owner device after a predetermined time, and wherein each nearby rescue device upon detection of the rescue-me signal transmits to the location server the unique identifier and location of the tag sending the rescue-me signal.

17. The system of claim 2 wherein the set of computer instructions is further adapted to reduce the frequency of contact between the tag and the owner device if the tag is additionally within range of one of the electronic devices designated as a home device.

18. The system of claim 2 wherein the control circuit further includes at least one accelerometer to determine if the tag is being moved and, if so, an estimated movement distance, whereby if the estimated movement distance is not proportionate to a reduction in signal strength between the owner device and the tag, then the system assumes the estimated movement distance is most accurate.

19. A processor-implemented method for tracking the location of an object in an area having a plurality of electronic devices connected via a network through a variety of communication protocols, the method comprising:
- a) providing a location server having at least a non-transitory computer-readable storage medium and in communication with the network and each of the plurality of electronic devices, each of the electronic devices being associated with a last-known device location within the area that is stored in the storage medium of the location server; and an electronic tag having a computer-implemented control circuit to enable wireless communication with the network both through any of the electronic devices and through any of the variety of communication protocols, the control circuit further including a power source, a processor, and a second non-transitory computer-readable storage medium containing a set of computer instructions adapted for causing the control circuit to maintain at least periodic contact with the location server through the network;
- b) the location server receiving periodic contact with the tag through one or more of the devices;
- c) storing in the storage medium of the location server an approximate location of the electronic tag based on the most recent contact with the electronic tag, the last-known device location of each device through which the tag communicated with the location server, and the communication protocol used between the tag and its nearest electronic device.

20. The method of claim 19 further including the step:
- d) storing in the storage medium of the location server an approximate radial distance from the stored location of the electronic device that the tag is located within, based on the communication protocol used between the tag and its nearest electronic device.

21. The method of claim 20 further including the step:
- e) designating one of the electronic devices as the owner device of the object with which the tag is affixed, the owner device maintaining at least periodic contact with the location server through the network and transmitting to the location server the location of the tag and to the extent possible the location of the owner device.

22. The method of claim 21 further including the step:
- f) upon losing contact between the tag and the owner device, the owner device signaling the location server to go into a community search mode, whereby if any other of the electronic devices communicates with the tag such a device is designated as a rescue device, and the location of the rescue device is communicated to the owner device until such time that the owner device reestablished communication with the tag.

23. The method of claim 21 further including the step:
- f) upon losing contact between the tag and the owner device, the owner device signaling the location server to go into a community search mode, whereby if any other three or more of the electronic devices communicates with the tag such devices are designated as rescue devices, and the location of the tag based on triangulation of the wireless signals between the tag and the rescue devices is communicated to the owner device until such time that the owner device reestablished communication with the tag.

24. The method of claim 21 further including the steps:
- a') the control circuit further including a GPS location circuit for determining the location of the electronic tag, the control circuit further adapted to communicate the location of the electronic tag to the location server through the network or any of the electronic devices connected to the network; and
- f) upon losing contact between the tag and all but one of the electronic devices, the circuit determining its location with the GPS location circuit and communicating its location to the location server through the one electronic device.

* * * * *